(12) United States Patent
Ikegami et al.

(10) Patent No.: US 7,697,155 B2
(45) Date of Patent: Apr. 13, 2010

(54) DOCUMENT MANAGEMENT APPARATUS AND DOCUMENT SYSTEM

(75) Inventors: Hiroaki Ikegami, Ashigarakami-gun (JP); Katsuhiko Itonori, Ashigarakami-gun (JP); Masahiro Kato, Ashigarakami-gun (JP); Shunichi Kimura, Ashigarakami-gun (JP); Hiroki Yoshimura, Ashigarakami-gun (JP); Hideaki Ashikaga, Ashigarakami-gun (JP); Masanori Satake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1085 days.

(21) Appl. No.: 11/067,737

(22) Filed: Mar. 1, 2005

(65) Prior Publication Data

US 2006/0017950 A1    Jan. 26, 2006

(30) Foreign Application Priority Data

Jul. 20, 2004    (JP) .............................. 2004-211465

(51) Int. Cl.
*G06F 3/12* (2006.01)
*G06G 1/14* (2006.01)
*G06Q 10/00* (2006.01)
*G05B 19/418* (2006.01)

(52) U.S. Cl. ...................... 358/1.15; 235/385; 340/540; 340/568.1; 340/572.3; 382/306; 705/22; 705/28; 705/8

(58) Field of Classification Search ................. 358/1.15
See application file for complete search history.

(56) References Cited

U.S. PATENT DOCUMENTS

| | | | | |
|---|---|---|---|---|
| 4,656,463 A * | 4/1987 | Anders et al. ............. 340/573.4 |
| 5,249,827 A * | 10/1993 | Olson ......................... 283/36 |
| 5,635,693 A * | 6/1997 | Benson et al. ........... 340/10.33 |
| 5,739,765 A * | 4/1998 | Stanfield et al. ........ 340/825.49 |
| 5,798,694 A * | 8/1998 | Reber et al. ................. 340/540 |
| 5,963,134 A * | 10/1999 | Bowers et al. ............. 340/572.1 |
| 6,098,064 A * | 8/2000 | Pirolli et al. ................... 707/2 |
| 6,192,165 B1 * | 2/2001 | Irons ......................... 382/306 |
| 6,405,924 B1 * | 6/2002 | Shah ..................... 235/462.08 |
| 6,843,415 B2 * | 1/2005 | Vogler ........................ 235/385 |
| 2002/0016825 A1 * | 2/2002 | Uchida et al. ............... 709/207 |
| 2002/0095411 A1 * | 7/2002 | Caldwell et al. .............. 707/5 |

FOREIGN PATENT DOCUMENTS

JP    11-134327    5/1999

(Continued)

OTHER PUBLICATIONS

Keown, Joel, "Case study: Document management for a SONGS", Inform v14n1 pp. 48-52, Jan./Feb. 2000, ISSN: 0892-3876.*

(Continued)

*Primary Examiner*—King Y Poon
*Assistant Examiner*—David S Cammack
(74) *Attorney, Agent, or Firm*—Oliff & Berridge, PLC (57) ABSTRACT

A document management apparatus and a document management system that selects the document which are best to digitize from among document being used in an office, and set the priority for digitization of each document are provided. The document management apparatus comprising: an accumulator apparatus that stores, the document ID, used place and used time for a document that is used; a computing part that analyzes information stored in accumulator apparatus, and for each document, computes the usability of the document data to be digitized; a specifying part that specifies document that correspond to document data for which the usability is relatively high by comparing it to the usability already computed for the data for each document; and output part that outputs the specified result to client.

20 Claims, 7 Drawing Sheets

FOREIGN PATENT DOCUMENTS

| | | |
|---|---|---|
| JP | 11-184874 | 7/1999 |
| JP | 2000-35994 | 2/2000 |
| JP | 2002-73647 | 3/2002 |
| JP | A 2002-269639 | 9/2002 |
| JP | A 2003-182820 | 7/2003 |
| JP | 2004-152258 | 5/2004 |
| ZA | 9901636 A * | 9/1999 |

OTHER PUBLICATIONS

"Workflow, Realize Digitalization of Atypical Business Having Complicated Process Using "General Administration Workflow Building Solution" of SCBank, Srl Inc.," Nikkei Information Strategy, vol. 11, No. 4, Japan, Nikkei Business Publishing Inc., Apr. 24, 2002, pp. 124-125.

"CITI Document 2000," Document Management System <NTT Software>, Manage Lifecycle of Document, Convert to PDF and Share, Network Computing, vol. 11, No. 8, Japan, Ric Telecom Corporation, Aug. 1, 1999, pp. 130-131.

Dec. 1, 2009 Office Action issued in Japanese Application No. 2004-211465.

* cited by examiner

| DOCUMENT ID | INSTALLATION SITE | TIME |
|---|---|---|
| 0000000124 | PRINTER | 2004/05/21 10:58:04 |
| | BOOKSHELF B | 2004/05/21 18:00:45 |
| | ACCOUNTING SECTION | 2004/05/24 09:35:21 |
| | BOOKSHELF B | 2004/05/24 11:54:02 |
| | DEVELOPMENT SECTION | 2004/06/02 15:24:12 |
| | MATERIAL SECTION | 2004/06/03 09:02:33 |
| | QUALITY MANAGEMENT SECTION | 2004/06/03 10:00:15 |
| | DEVELOPMENT SECTION | 2004/06/04 10:24:13 |
| | BOOKSHELF B | 2004/06/04 10:30:51 |
| | DEVELOPMENT SECTION | 2004/06/7 16:15:47 |
| | SHREDDER A | 2004/06/7 16:17:32 |
| ⋮ | ⋮ | ⋮ |

DOCUMENTS THAT ARE BEST TO DIGITIZE ARE AS FOLLOWS.

| No. | DOCUMENT ID | TITLE/TYPE | STORAGE PLACE | REMARKS (USAGE) | |
|---|---|---|---|---|---|
| 1 | 0000000124 | ○○○○○○ /PLANNING DIAGRAM | BOOKSHELF B | USED FREQUENCY [HIGH] USED AREA[WIDE] | DISPLAY DETAILS |
| 2 | 0000000186 | □□□□ /PLANNING DIAGRAM | BOOKSHELF B | USED FREQUENCY[MEDIUM] USED AREA[WIDE] | DISPLAY DETAILS |
| 3 | 0000000057 | ××××× /CONTRACT | BOOKSHELF A | USED AREA[WIDE] | DISPLAY DETAILS |
| 4 | 0000001532 | △△△△△ /SPECIFICATION | BOOKSHELF D | USED FREQUENCY[HIGH] | DISPLAY DETAILS |
| ... | ... | ... | ... | ... | |

PRINT

FIG. 8

DOCUMENT MANAGEMENT APPARATUS AND DOCUMENT SYSTEM

BACKGROUND OF THE INVENTION

1. Field of the Invention

The present invention concerns technology to support the digitization of documents.

2. Description of the Related Art

It is known to provide a technology that the present place of a publication or a document or the like are identified, by furnishing the publication or document files with an IC card that transmits radio signals. As well, it is known to provide a technology that point cards are furnished with a wireless tag, so that a reading device located inside a store reads information sent from this wireless tag to measure the frequency of store visits by a customer, reads information sent from this wireless tag using a reading device located inside the store, and also and locates the reading apparatus in several places in the store, to sense the movements and the amount of time the customer spends inside the store.

In businesses and in government, reading the contents of documents using image scanners and work to digitize documents is being carried out in order to raise the efficiency of use of documents used in work. Here, in a case where many documents that exist in offices are being gradually digitized over a period of 2 or 3 years, when digitization is carried out only at random, because documents for which the degree of importance of digitizing is not very high will be digitized soon, and because digitization is completed as soon as possible when it seems opportune to do so, such problems arise as deferring the digitization of documents for which one would prefer ongoing improvements in usage.

SUMMARY OF THE INVENTION

The present invention has been made in view of the above circumstances and provides a document management apparatus and document management system that make it possible to select the documents that need to be digitized from among the documents used, and to set the priority order for digitizing each document.

In order to address the above problems, the present invention provides a document management system furnished with a document management apparatus furnished with: an accumulation part that stores, in correspondence, document identifiers assigned to the documents used, used places of the documents, and used time of the documents; a computing part that computes the document data usage efficiencies, based on the history of used places and used time stored in the accumulator device in correspondence with document identifiers for each document; an specification part that compares all document data usage efficiencies computed by the computing part and identifies the document that corresponds to document data having predetermined usability; and an output part that outputs the identified results of the specification part.

As well, the present invention provides a document management system furnished with: a plurality of reading parts that read from a document or from a receptacle that accommodates documents, a document identifier assigned to the document; an accumulator device that stores, in correspondence, a document identifier read by any one of the plurality of reading parts, place information representing a installation site of the reading part that read the document identifier, and time information representing the time at which the document identifier was read; a computing part that computes the document data usability, based on the history of used place and used time stored in the accumulator device in correspondence with document identifiers for document; a specification part that compares all document data usability computed by the computing part and identifies the document that corresponds to document data having predetermined usability; and an output part that outputs the identified results of the specification part.

As well, the present invention provides a document management apparatus furnished with an accumulation part that stores, in correspondence, document identifiers assigned to the documents used, the used place of the documents, and used time of the documents; a computing part that computes the document data usability, based on the history of used place and used time stored in the accumulator device in correspondence with document identifiers for document; a comparison part that compares all document data usage efficiencies computed by the computing part; a setting part that sets the priority of digitization for each document corresponding to data of each document, based on the comparison results from the comparison part; and an output part that outputs the set results of the priority set by the setting part.

As well, the present invention provides a document management system furnished with a plurality of reading parts that read from a document or from a receptacle that accommodates documents, a document identifier assigned to the document; an accumulation part that stores, in correspondence, document identifiers assigned to the documents used, the used place of the documents, and used time of the documents; a computing part that computes the document data usability, based on the history of used place and used time stored in the accumulator device in correspondence with document identifiers for document; a comparison part that compares all document data usability computed by the computing part; a setting part that sets the priority of digitization for each document corresponding to each document data, following the comparison results by the comparison part; and an output part that outputs setting results the priority of by the setting part.

As well, the present invention provides a document management method wherein a system having a plurality of reading parts that read from a document or from a receptacle that accommodates document, a document identifier assigned to the document and an accumulator device that stores information; the system comprising: accumulating, in correspondence, a document identifier read by any one of the plurality of reading parts, place information representing a installation site of the reading part that read the document identifier, and time information representing the time at which the document identifier was read; computing the document data usage efficiencies, based on the history of used place and used time stored in the accumulator device in correspondence with document identifiers for each document; comparing all document data usage efficiencies computed in the step of the computing and identifying the document that corresponds to document data having predetermined usability; and outputting the results identified in the step of the identifying.

As well, the present invention provides a document management method wherein a system having a plurality of reading parts that read from a document or from a receptacle that accommodates document, a document identifier assigned to the document and an accumulator device that stores information, the system comprising: accumulating, in correspondence, a document identifier read by any one of the plurality of reading parts, place information representing a installation site of the reading part that read the document identifier, and time information representing the time at which the document identifier was read; computing the document data usage efficiencies, based on the history of used place and used time stored in the accumulator device in correspondence with document identifiers for each document; comparing all document data usage efficiencies computed in the step of the computing; setting the priority of digitization for each document corresponding to data of each document, based on the comparison results from the comparison part compared in the step of the comparing; and outputting the set results of the priority set by the setting part in the step of the setting.

BRIEF DESCRIPTIONS OF THE DRAWINGS

Embodiments of the present invention will be described in detail based on the following figures, wherein:

FIG. 1 illustrates wireless tags 30 attached to documents 10 and files 20 and the like.

DETAILED DESCRIPTION OF THE INVENTION

Below, an embodiment of the present invention will be described with reference to the drawings.

Figure 1:
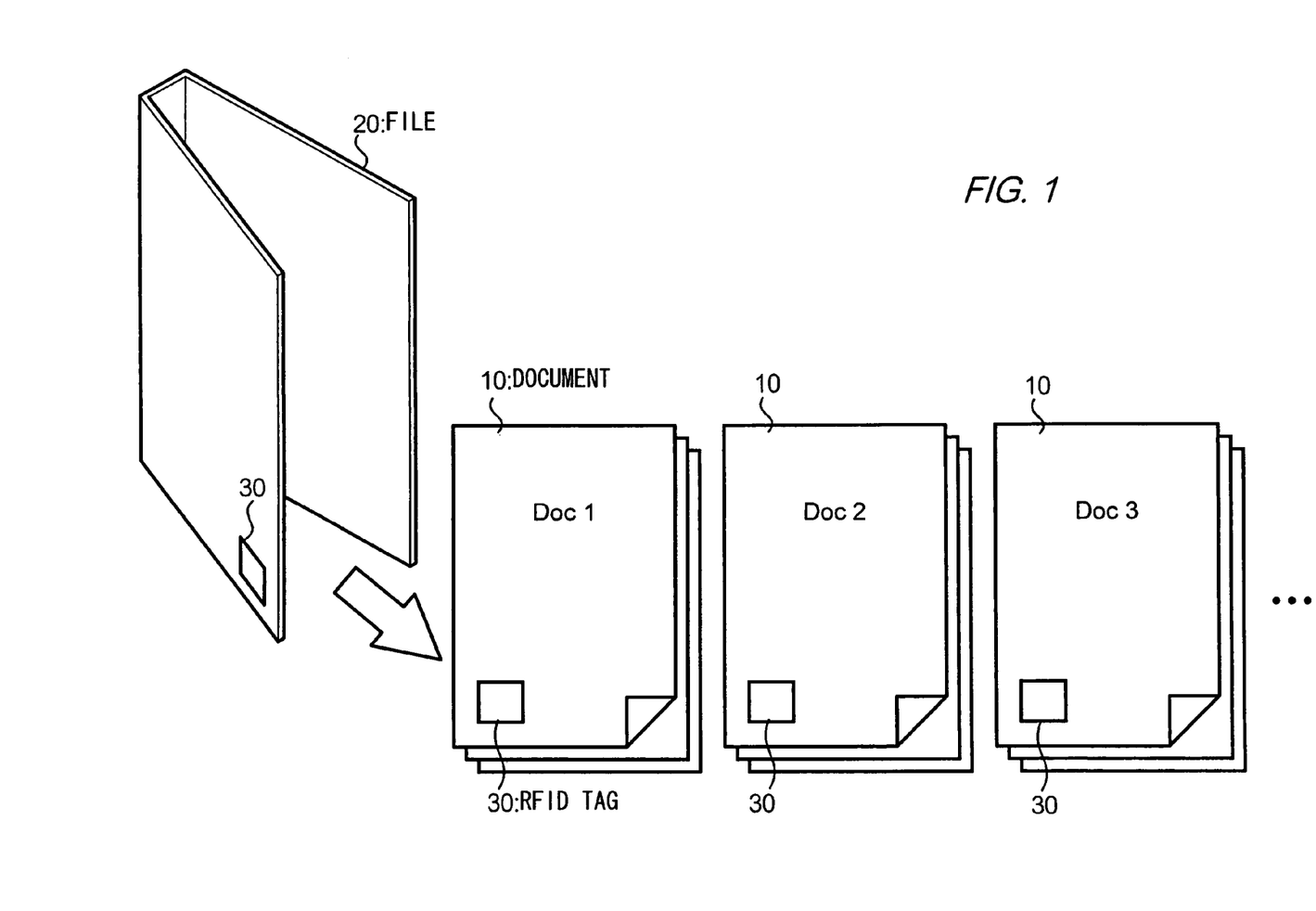

A document management apparatus and a document management system according to the present invention are provided in an enterprise or government office between six months to a year before initiating the digitization work. As shown in FIG. 1, RFID tags 30 are attached to the existing office documents 10 and file 20.

RFID tag 30 stores, a unique document ID for each document 10 and a unique file ID for each file are stored. Specifically, in each RFID tag 30 attached to document 10, in addition to the document ID and information such as the type and title and the like for this document 10, the total number of pages, the priority and the storage place are stored. As well, RFID tag 30 attached to file 20 stores the file ID, and information such as the priority and storage place or the like for this file 20, and the document ID for each document 10 bound together in file 20. Moreover, RFID tag 30 may also be configured to simply store the unique tag identifier for each RFID tag 30, and the correspondences between the document ID described above and file ID may be registered in a database on a server.

Figure 2:
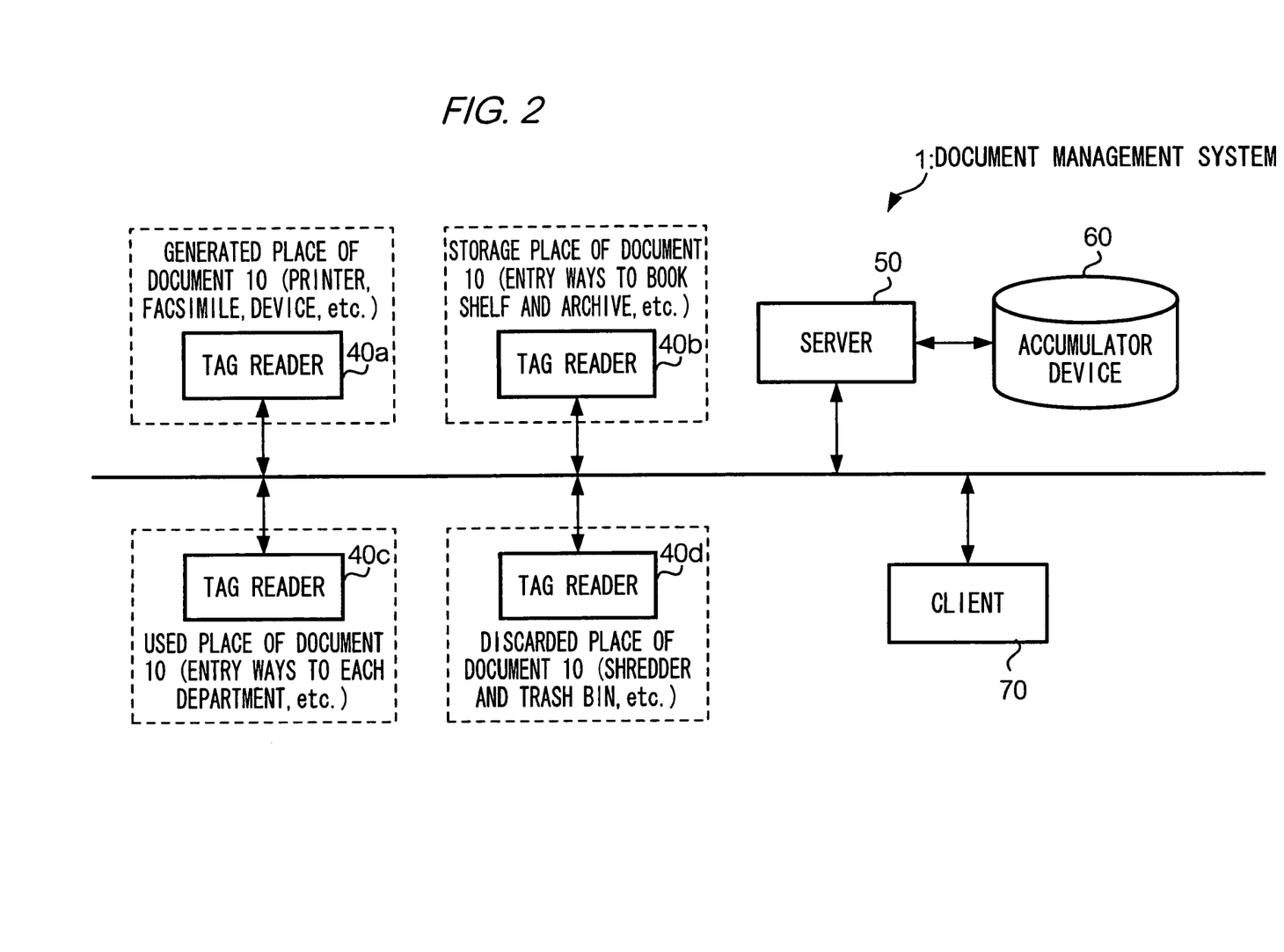
FIG. 2 illustrates the configuration of document management system 1.

FIG. 2 illustrates the configuration of the document management system. As shown in the figure, tag readers 40a-40d are provided in places for generating new document 10 such as printers, fax machines and copiers, in places for storing document 10 and file 20 such as the entryways for bookshelf and archives, in places where document 10 and file 20 are used, such as departments, and in places where document 10 and file 20 are discarded, such as shredders and trash bins. As well, each tag reader 40a-40d performs wireless communications with RFID tag 30 located near the tag readers, reads information such as the document ID from RFID tag 30, and transmits to server 50 the information read and the identifier that identifies the tag readers (below, in this disclosure, "the reader ID").

Figure 3A:
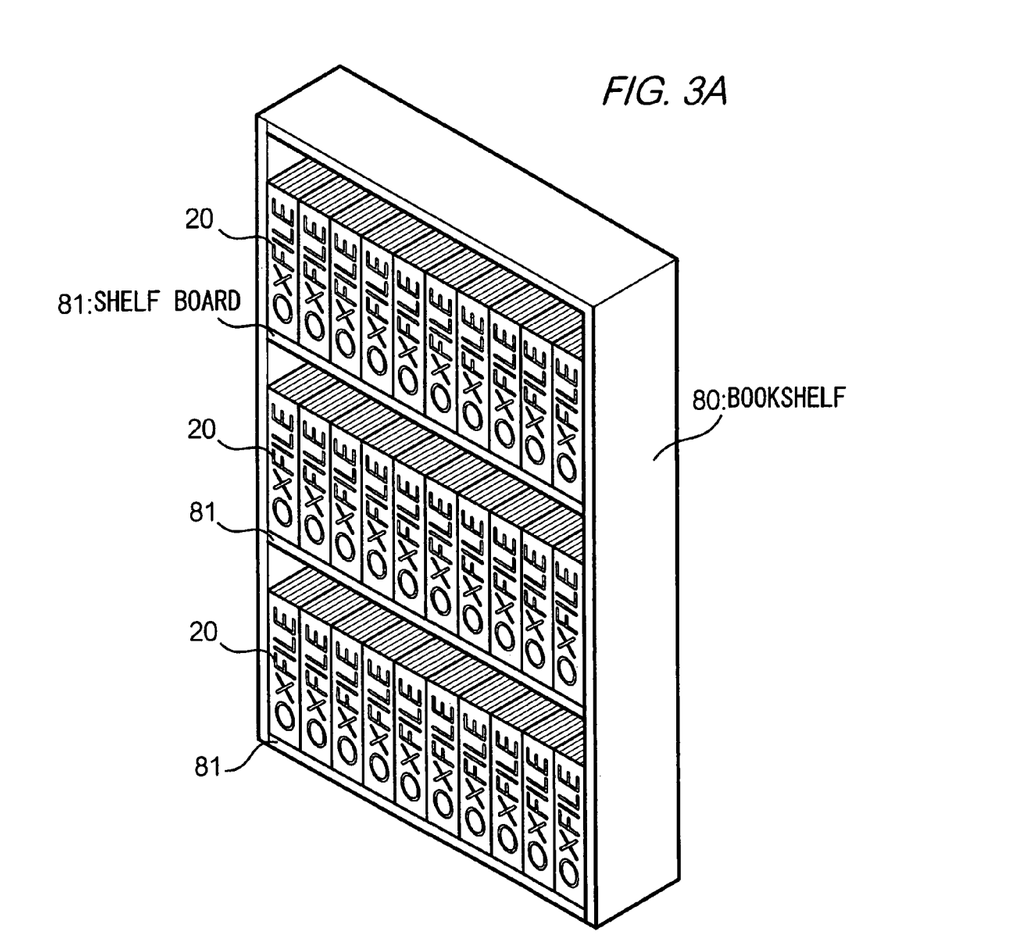
FIG. 3 illustrates a tag reader 40b to be placed on shelf board 81 of bookshelf 80.
Figure 3B:
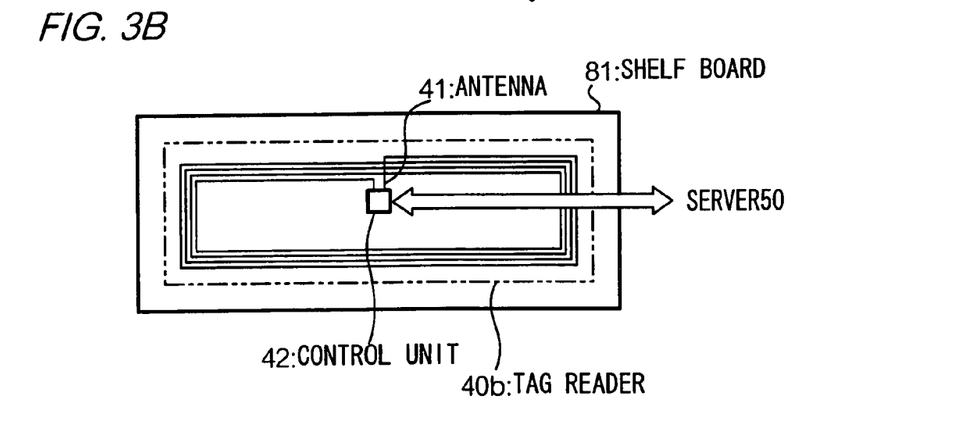

FIG. 3(a) and FIG. 3(b) shows tag reader 40b disposed on bookshelf 80 and on shelf board 81. Bookshelf 80 shown in FIG. 3(a), in the interior of each shelf board 81, is incorporated a tag reader 40b equipped with an antenna and a control unit 42 for performing wireless communications with RFID tag 30 attached to file 20 and document 10 that have been put on shelf board 81, as shown in FIG. 3(b). In the present specification, unless otherwise stated, tag readers 40a-40b will be referred to as "tag reader(s) 40".

Returning to FIG. 2, server 50 stores to accumulator apparatus 60 information such as document IDs that tag reader 40 read from RFID tag 30 in correspondence place information representing the installation site of the tag readers 40 that read this information (for example, printer A, bookshelf B, accounting section, shredder A) and time information representing the present time (year, month, day, hour, minute, second). Moreover, tag reader 40 may take the form of transmitting to server 50 the information read from RFID tag 30, in correspondence with place information representing the installation site of tag reader 40, and time information representing the time at which information was read from RFID tag 30.

Figure 4:
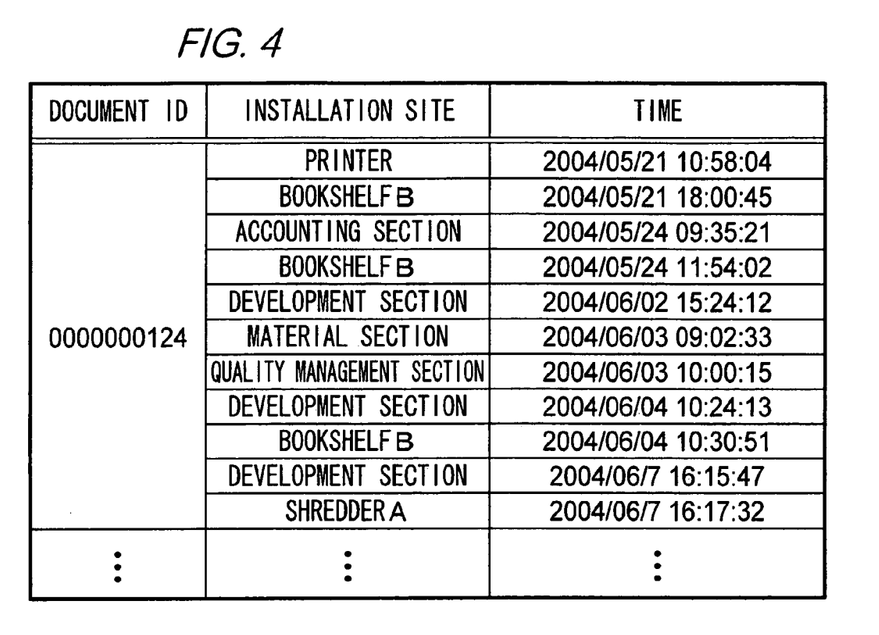
FIG. 4 illustrates the structure of the data stored in accumulator apparatus 60.

FIG. 4 illustrates an example of data stored in accumulator apparatus 60. As shown in the figure, accumulator apparatus 60, for each document ID, stores place information representing the installation site of tag reader 40 that read this document ID, and time information representing the time when this document ID was read. Furthermore, in accumulator apparatus 60 (not depicted), for each document ID, information representing the type for this document 10 (for example, planning diagrams, specification, contract, etc.) and the title, the general page number, the priority, and the storage place, is registered. Moreover, in the case where the file ID is read from RFID tag 30 attached to file 20, the file ID instead of the document ID is stored in the data shown in FIG. 4.

Server 50 analyzes the information stored by accumulator apparatus 60, and for each document, computes the document data usability to be had by digitizing document 10. Then, server 50 compares the usage efficiencies computed for each document, and selects, as the document that is best to digitize, the document 10 corresponding to the document data with the highest usability. The display screen of client 70 displays a list or the like of the documents 10 that are best to digitize.

Figure 5:
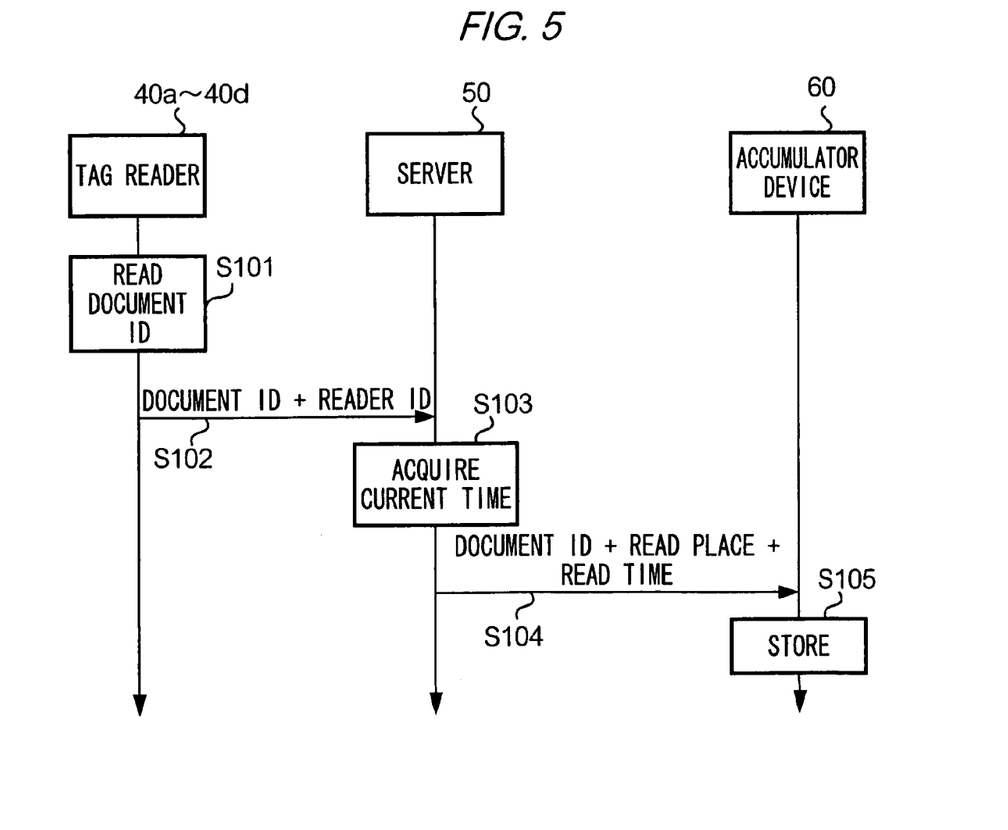
FIG. 5 is a flowchart showing the operations for each part of document management system 1 up to the point where data is stored in accumulation apparatus 60.

Next, the operations of document management system 1 are explained. First, the office documents 10 and file 20 or the like have RFID tag 30 attached for storing information such as the document and file IDs. Afterward, when document 10 or file 30 with RFID tag 30 attached are moved by someone into an office, as shown in FIG. 5, information such as the document ID is read from RFID tag 30, using a tag reader 40 located in each place inside the office (Step S101). Specifically, when document 10 is returned to bookshelf 80, using tag reader 40b installed in shelf board 81, the document ID or the like is read from the RFID tag 30 attached to document 10. Subsequently, tag reader 40 transmits information such as the document ID read from RFID tag 30 and the reader ID of tag reader 40 to server 50 (Step S102)

Server 50, when it receives the document ID and the reader ID, first, acquires the present moment in time, and assumes this acquired moment as the reading time of the document ID. Server 50 further has a data table in which is registered information representing the installation site of the tag readers 40 for each reader ID, and by displaying this data table, specifies the installation site corresponding to the reader ID received. Then, server 50 transmits to accumulator apparatus the document ID received from tag reader 40, the installation site of tag reader 40b that read this document ID, and the read time of the document ID (Step S104), and stores the information in accumulator apparatus 60 (Step S105). In so doing, the document ID read by each tag reader 40, the installation site of the tag reader 40b that read the document ID, and the read time for each document ID are stored.

Figure 6:
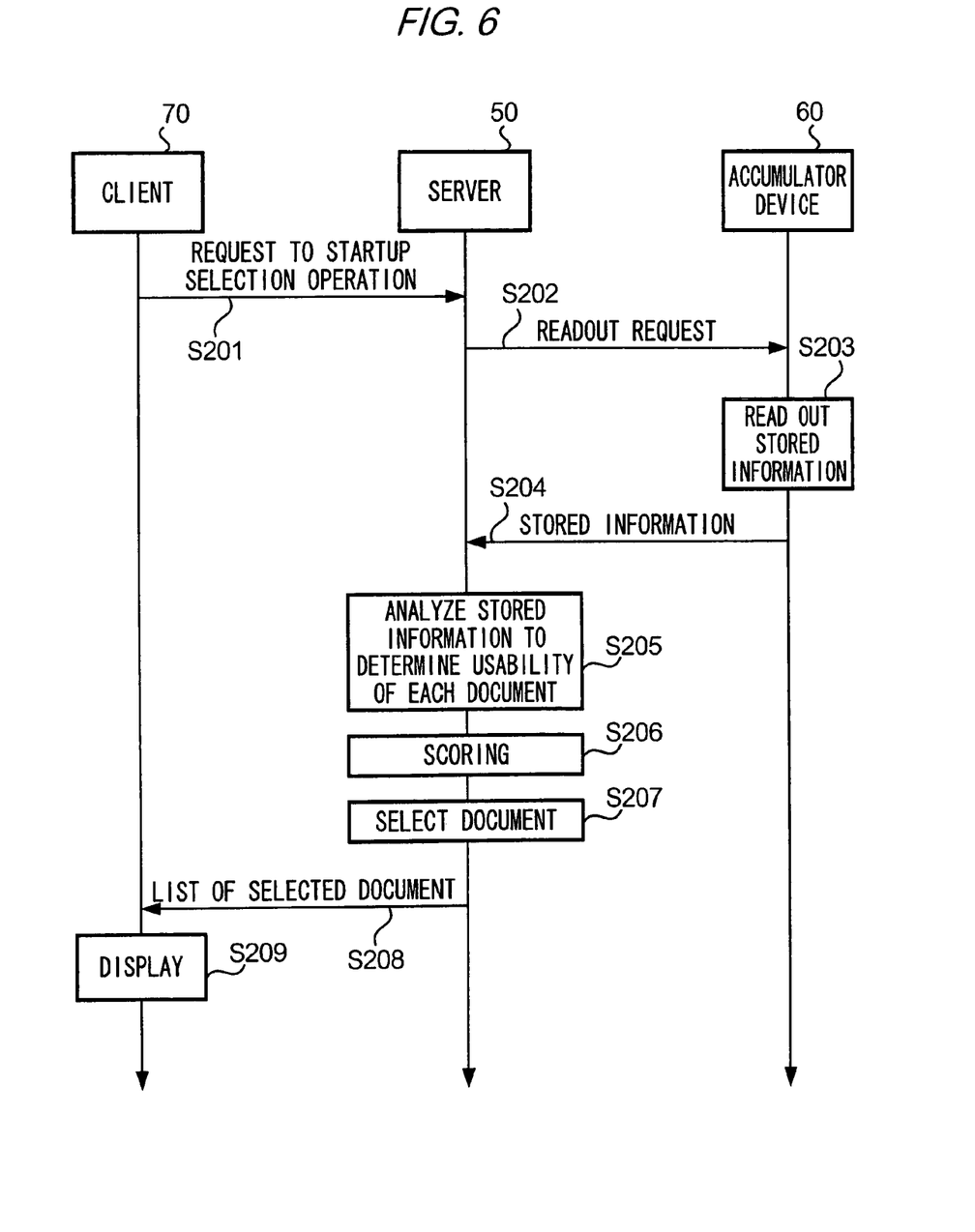
FIG. 6 is a sequence chart showing the operations of each part of document management system 1 in the case of selecting documents 10 that are best to be digitized.

FIG. 6 is a flowchart showing the operations for each part of document management system 1 in the case of selecting the document 10 that is best to digitize. As shown in the figure, when server 50 receives a selection operation startup request from client 70 (Step S201), it transmits to accumulator apparatus 60 an accumulator information readout request (Step S202). When accumulator apparatus 60 receives the readout request, it reads out the information (refer to FIG. 4) stored in accumulator apparatus 60 (Step S203), and transmits it to server 50 (Step S204). Server 50 then analyzes the stored information received from accumulator apparatus 60, and for each document 10, determines the document data usability to be had by digitizing document 10. It is to be noted that server 50, as document data usability, determines information representing each item shown below.

(1) "Usage Frequency"

The number of time document 10 was taken in to each used place during a prescribed period of time such as every three months.

(2) "Movement Path"

Information representing the history of places to which the document 10 was taken, used and returned again to its storage place. From this information, the used places through which document 10 passed, and the number of used places through which document 10 passed, can be known.

(3) "Average Residence Time"

The time is the average value of the time that document 10 spent in a single place. By referring to the average value of the residence time, if the average retention time of document 10 is comparatively short, and if the document is used among a great number of departments, it is possible to determine that document 10 is for circulation purpose. By attaching this type of document 10 to e-mail after digitization, it is possible to provide information only to a necessary recipient within a shorter time.

(4) "Lifetime"

This refers to the time wherein document 10 is generated and destroyed; the time is only computed for documents 10 that have been destroyed by shredding or put into a trash bin. When the lifetime of document 10 is known, if document 10 is one with a short lifetime or, moreover, with a low usage frequency, it can be known that its digitization priority may be lowered because it will not be possible, even with digitization, to improve its usability to the targeted degree. Conversely, in a case that document 10 has a low usage frequency, if it is a document 10 with a long lifetime, it can be known that it is possible to improve the efficiency of use of storage space, by digitizing document 10.

(5) "Used Time Rate"

This is percentage of time that a document 10 spends in each usage area, from the time the document is generated until the time it will be destroyed. Moreover, the used time for document 10 (one batch) can be computed by taking the difference between the time at which document 10 was taken into the used place and the time document 10 was taken out of the used place. As well, it is possible to compute total used time by subtracting the time the document 10 spends in the storage area from the lifetime of document 10.

(6) "The First Used Place and the Usage Frequency"

The place where document 10 is first used after taken away from its storage place and the usage frequency used in the place. From that information, the work station assumed to be important for document 10 and how frequently it was taken there become clear.

(7) "Number of Copies and Copy Place"

This information is the number of times document 10 was copied and the places where document 10 was copied. If the number of copies and the number of copy place is large, it can be expected that there will be used usability improvements from digitizing document 10.

Server 50 analyzes the accumulation information of accumulator apparatus 60, and when the usability for the above-described (1) through (7) are determined for each document 10, the documents are given a score based on the determined usability (Step S206). The score set here, a score being high indicates that a document are best to be digitized; namely, a score being high represents a high digitization priority for document 10.

For example, server 50, based on the usability of (1) through (7) above, adds 30 points to document 10 with a "used frequency" above a preset threshold, and to document 10 with a "movement path" indicating over five used places. As well, server 50 adds 20 points to document 10 with more than three copies made according to "number of copies" or more than three "copy places", and with a "lifetime" that is longer than a preset threshold.

As well, server 50 performs addition and subtraction of points based on the usability of each of the items (1) through (7) above, such as "Also add 7 points for document 10 having a relatively short retention time and having more than five used places," "Add six points for document 10 having a low used frequency, and at one time, being taken from a storage place and used at more than 3 departments," "Subtract 10 points if used frequency for document 10 is high but it is always being used at one only place", and "Subtract 10 points for document 10 if its lifetime is short and its frequency of use low".

In so doing, when finished assigning points to document 10, server 50, after selecting documents 10 having scores higher than a predetermined threshold, such as 80 points, from among the documents with scores assigned (Step S207), generates and transmits to client 70 display data representing a list of selected documents 10 (Step S208). Client 70 displays on a display screen the list of document 10 for which digitization would be best, according to the display data received, as shown for example in FIG. 7 (Step S209).

Figure 7:
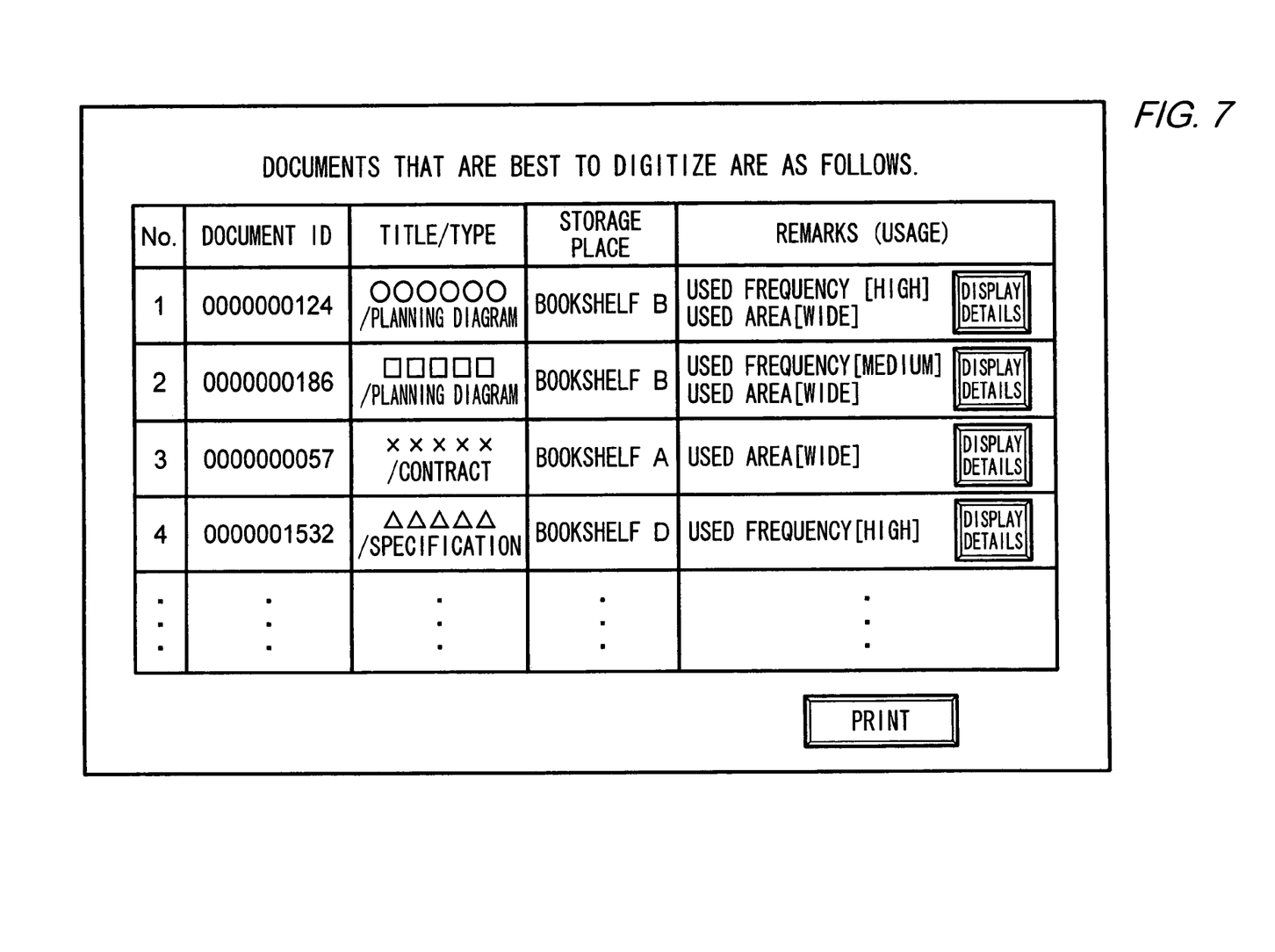
FIG. 7 illustrates an example screen for client 70.

Moreover, server 50 selects from among the scored document 10 the highest-scoring 30%, and may take the form of transmitting to client 70 the display data generated that represents this list. As well, the list of document 10 may be printed rather than displayed.

In another configuration, a list that may not be only a list of documents that are best to be digitized but also document 10 of low importance, with low scores, and document 10 that are better stored left as they are, after careful investigation of their low scores may also be output.

As well, server 50 may output a sorted list of document 10 sorted in ascending or descending order with respect to their scores for all scored document 10, set the digitization priority based on the scores, and generate and output to client 70 data representing the digitization priorities for each document 10.

With the present embodiment explained above, in accumulator apparatus 60, the ID, used place and used time for document 10 used are stored. Server 50 analyzes information stored in accumulator apparatus 60, and for each document

10, calculates the document data used usability to be gained by digitizing document 10. Then, server 50, by comparing the usability calculated using the data for each document, specifies the documents 10 that correspond to document data of highest used usability, and outputs the specification results to client 70. As well, server 50, based on the comparison results for the above usability for all document data, outputs to client 70 the digitization priority established for each document. Accordingly, the person responsible for the digitization work for document 10, because he or she is able to know, before starting the digitization work, the selection results for documents 10 that are poor candidates for digitization, and about the priorities in case of digitization, he or she becomes able to efficiently perform digitization work for document 10

(1) For the embodiment above, where a new document 10 is generated in the office, there are the cases where new document 10 is produced by hand, where new document 10 is printed from a printer, where new document 10 is printed from a fax machine, and where an existing document 10 is copied and new document 10 is output. Here, excluding the hand-written case, the cases of printer output, fax receipt, and copier output, by server 50 being made to perform the operations shown in FIG. 8, it is possible to automate the work of registering in accumulator apparatus 60 by writing in RFID tag 30 information about the new document 10 such as the document ID, the priority, and the storage place. However, it is necessary to connect server 50 to the writing apparatus that writes the information into the RFID tag 30, to the printer, to the fax machine, and to the copier, using a LAN or the like.

Figure 8:
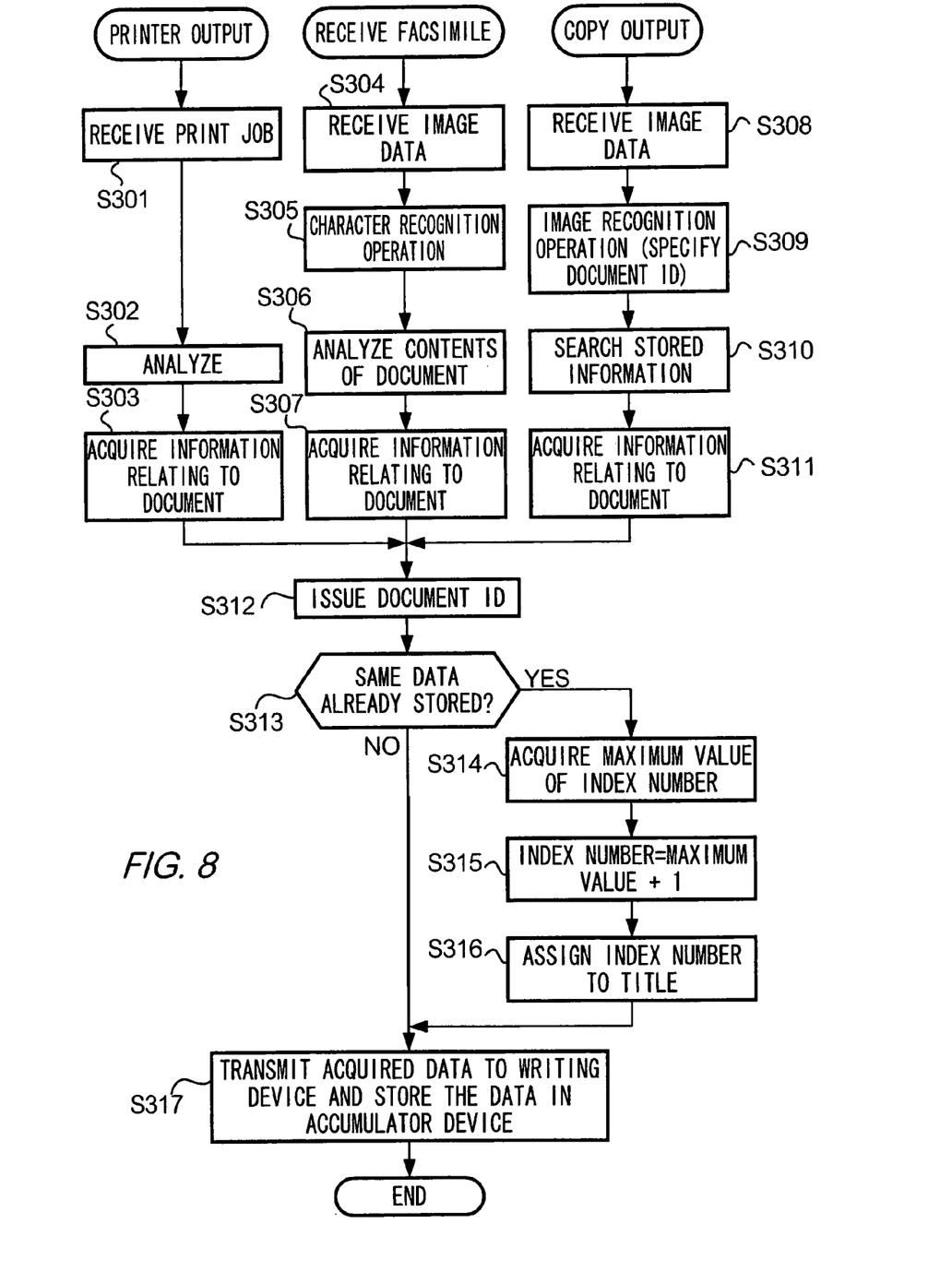
FIG. 8 is a flowchart showing the operations of server 50 in the case of Modification example (1).

As shown in FIG. 8, first, in the case of printer output, server 50 receives from the printer a print job including the document data (Step S301). Next, server 50 analyzes the print job received (Step S302), and acquires information about the title, the general page number, the priority and the storage place for document 10 to be printed according to this print job (Step S303). Here, the title of document 10 is, for example, the file name of the document data. As well, as attachment information of the document data, by duty-assigning the settings for the type, priority and storage place of document 10, server 50 can acquire information from the print job about the type, priority and storage place of document 10.

Next, in the case of fax reception, server 50 receives document image data from facsimile apparatus (Step S304). After performing character recognition operations on the received image data (Step S305), server 50 analyzes the content of document 10 that was acquired by printing this image data (Step S306), and acquires information such as the type, the title, the general number of pages, the priority and the storage place of document 10 (Step S307). Here, the title of document 10 can be assumed to be the character string written on the first line of the first page after the fax face sheet, the character string written in a typeface larger than other characters on the first page after the fax face sheet, or the like. As well, for the priority of document 10, it is possible to assume as fax addressee a mention of someone of official importance, and for example assign "low" to anyone below the rank of "chief clerk", "middle" to anyone from the rank of "chief clerk" up to the rank of "section chief", and "high" anyone above the rank of "section chief". As well, it is possible to specify the storage place of document 10 from the addressee of the fax and the type of document 10 received by FAX.

As well, in the case of copier output, first, server 50 receives from the copier the document image data copied (Step S308). Here, in document 10 that is basically the original for the copy, because RFID tag 30 is already supplied, for example, by printing a document ID code on the surface of RFID tag 30, it is possible to specify the document ID by image recognition operations on the image data received (Step S309). Next, server 50 searches for information registered in accumulator apparatus 60 using the specified document ID as search key (Step S310), and from the information registered in accumulator apparatus 60, acquires information such as the type, title, general page number, priority and storage place for the original document 10 copied (Step S311).

In so doing, when the information about new document 10 is acquired, server 50 issues a document ID (Step S312). Server 50 then searches for information registered in accumulator apparatus 60 and investigates whether or not information identical to the type, title, general page number, priority and place information or the like, acquired as information about new document 10, is already stored in accumulator apparatus 60 (Step S313).

As a result, in a case that the same information is stored in accumulator apparatus 60 (Step S313: YES), index numbers are accordingly assigned in a place next to the title of document 10 (Step S314-S316). For example, in the case of copying the same document 10 twice, in addition to the original document, because two copies of document 10 generated by the copying exist, in the case where the title of the original copy of document 10 is "00000", the title of the first copy of document 10 generated by copying becomes "00001", the title for the second becomes "00002", and so on. Moreover, in the case of copier output, it is possible for the storage places to differ between a copy of document 10 and the original document 10. In this case, the information concerning the new storage place is set by the user accordingly.

Server 50 then transfers to writing apparatus (not shown) information such as the type, title, general page number, priority and storage place of the new document 10, and indicates the writing of RFID 30. As well, server 50 simultaneously registers in accumulator apparatus 60 information about new document 10 mentioned above (Step S317). Assuming this design, because it is possible to automate the work of registering in accumulator apparatus 60 by writing into RFID tag 30 information such as the document ID, the priority and the storage place of the new document 10, it is possible make using document management system 1 more convenient.

(2) The above embodiment has been explained in the case of applying RFID tag 30 to document 10 and file 20 or the like, but RFID tag 30 may also be applied to such things as "clear files" (transparent envelopes for holding documents) and cases that hold document 10.

As well, character strings and bar codes representing document and file IDs may be printed on the surfaces of binders for document 10 and file 20, and in addition to the document ID, document 10 and file 20 may have a two-dimensional bar code representing the type, title, general page number, priority and storage place of document 10. However, in this case, images of document 10 and file 20 may be electronically acquired, and it is necessary to use a reading apparatus that reads such information as the document ID and file ID by applying image recognition processes on the image acquired, instead of tag readers 40*a*-40*d*. Moreover, the seal on which the character string or barcode that represents the document ID or the like is printed may be pasted onto document 10 or file 20.

(3) With the above embodiment, there is the problem of detecting which document 10, from among several documents bound into file 20, has actually been used. Here, with RFID tag 30 supplied to document 10 bound in file 20, an optical sensor may be installed in tag 30, and only in the case where this optical sensor continues to register that there is brightness above a predetermined threshold value exceeding 10 seconds, does it permit wireless communications for RFID tag 30. In the configuration, information such as the document ID from RFID tag 30 is transmitted to a tag reader 40 located somewhere near this place only in the cases when the user opens file 20 and views document 10 he or she wants to use for longer than a predetermined period, or in a case that a user is separating document 10 from file 20 for temporarily use. As a result, from among the multiple document 10 bound together in file 20, it is possible to correctly sense whether the user has indeed used document 10.

(4) The above embodiment has been explained in the case of reading document IDs and file IDs using tag readers 40a-40d, but, depending on the storage manager of document 10 the user of document 10, about the document used, the document ID, used place and used time may be input from server 50, and stored in accumulator apparatus 30.

As well, accumulator apparatus 60 may be a hard disk installed in server 50 (document management apparatus).

As described above, the present invention provides a document management system furnished with a document management apparatus furnished with: an accumulation part that stores, in correspondence, document identifiers assigned to the documents used, used places of the documents, and used time of the documents; a computing part that computes the document data usage efficiencies, based on the history of used places and used time stored in the accumulator device in correspondence with document identifiers for each document; an specification part that compares all document data usage efficiencies computed by the computing part and identifies the document that corresponds to document data having predetermined usability; and an output part that outputs the identified results of the specification part.

As well, the present invention provides a document management system furnished with: a plurality of reading parts that read from a document or from a receptacle that accommodates documents, a document identifier assigned to the document; an accumulator device that stores, in correspondence, a document identifier read by any one of the plurality of reading parts, place information representing a installation site of the reading part that read the document identifier, and time information representing the time at which the document identifier was read; a computing part that computes the document data usability, based on the history of used place and used time stored in the accumulator device in correspondence with document identifiers for document; a specification part that compares all document data usability computed by the computing part and identifies the document that corresponds to document data having predetermined usability; and an output part that outputs the identified results of the specification part.

For the present invention, the document management apparatus and document management system computes the document data usability for each document acquired by digitizing the document, corresponding to the document identifier for each document, based on the history of place information and information time information stored by accumulator device that corresponds to the document identifier for each document, specifies documents corresponding to document data for which used usability is high by comparing all computed document data usability, and outputs the specified result.

As well, the present invention provides a document management apparatus furnished with an accumulation part that stores, in correspondence, document identifiers assigned to the documents used, the used place of the documents, and used time of the documents; a computing part that computes the document data usability, based on the history of used place and used time stored in the accumulator device in correspondence with document identifiers for document; a comparison part that compares all document data usage efficiencies computed by the computing part; a setting part that sets the priority of digitization for each document corresponding to data of each document, based on the comparison results from the comparison part; and an output part that outputs the set results of the priority set by the setting part.

As well, the present invention provides a document management system furnished with a plurality of reading parts that read from a document or from a receptacle that accommodates documents, a document identifier assigned to the document; an accumulation part that stores, in correspondence, document identifiers assigned to the documents used, the used place of the documents, and used time of the documents; a computing part that computes the document data usability, based on the history of used place and used time stored in the accumulator device in correspondence with document identifiers for document; a comparison part that compares all document data usability computed by the computing part; a setting part that sets the priority of digitization for each document corresponding to each document data, following the comparison results by the comparison part; and an output part that outputs setting results the priority of by the setting part.

With the present invention, the document management apparatus and document management system computes the document data usability for each document, corresponding to the document identifier for each document, based on the history of place information and information time information stored by accumulator device that corresponds to the document identifier for each document, sets the priority of digitization for each document that corresponds to the data of each document, on the basis of the comparison result acquired, and outputs the priority setting result.

According to the present embodiments, it is possible for the document management apparatus and document management system to inform those who perform the document digitization which documents are better for digitization from among those used in an office or the like, and how to set the digitization priority for each document. Accordingly, it becomes possible to perform document digitization more efficiently.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, to thereby enable others skilled in the art to understand the invention with various embodiments and modifications as are suited to the particular use contemplated. It is intended that the scope of the invention be defined by the following claims and their equivalents.

The entire disclosure of Japanese Patent Application No. 2004-211465 filed on Jul. 20, 2004 including specifications, claims, drawings and abstract is incorporated herein by reference in its entirety.

What is claimed is:

1. A document management apparatus that manages used documents, the apparatus comprising:
   an accumulation part that stores, in correspondence, document identifiers assigned to the used documents, a place where the documents were used, and a period of time that the documents were used;

a computing part that computes document data usage efficiencies based on a history of the place where the documents were used and the period of time that the documents were used as stored in the accumulator device in correspondence with document identifiers for each document, wherein the document data usage efficiencies are a score which is computed by the computing part, which computes the score based on a summation of a predetermined score value assigned to a number of times a document was used and a predetermined score value assigned to the period of time that the documents were used as stored in the accumulator device;

a specification part that analyzes document data usage efficiencies, computed by the computing part, of at least a portion of the document, and identifies documents that meet a predetermined threshold data efficiency; and an output part that outputs the documents identified by the specification part, wherein the document identifiers are stored in a wireless tag and the wireless tag has an optical sensor installed in the wireless tag, the optical sensor sensing brightness above a predetermined threshold brightness value, and wherein the optical sensor permits wireless communications for the wireless tag under the condition that the predetermined threshold brightness value is detected for a period that exceeds a predetermined time period.

2. A document management apparatus that manages used documents, the apparatus comprising:

an accumulation part that stores, in correspondence, document identifiers assigned to the used documents, a place where the documents were used, and a period of time that the documents were used;

a computing part that computes the document data usage efficiencies based on a history of the place where the documents were used and the period of time that the documents were used as stored in the accumulator device in correspondence with document identifiers for each document, wherein the document data usage efficiencies are a score which is computed by the computing part, which computes the score based on a summation of a predetermined score value assigned to a number of times a document was used and a predetermined score value assigned to the period of time that the documents were used as stored in the accumulator device;

a comparison part that compares document data usage efficiencies computed by the computing part, of at least a portion of the documents, wherein documents that meet a predetermined threshold data efficiency are identified;

a setting part that sets a priority of digitization for each identified document corresponding to data of each document, based on the comparison results from the comparison part; and an output part that outputs the priority of digitization set by the setting part, wherein the document identifiers are stored in a wireless tag and the wireless tag has an optical sensor installed in the wireless tag, the optical sensor sensing brightness above a predetermined threshold brightness value, and wherein the optical sensor permits wireless communications for the wireless tag under the condition that the predetermined threshold brightness value is detected for a period that exceeds a predetermined time period.

3. A document management system that manages a plurality of documents, the system comprising:

a plurality of reading parts that read from at least one document of the plurality of documents or from a receptacle that accommodates the at least one document, a document identifier assigned to the document;

an accumulator device that stores, in correspondence, a document identifier read by any one of the plurality of reading parts, places information representing an installation site of the any of one of the plurality of reading parts that read the document identifier, and time information representing a period of time in which the document identifier was read;

a computing part that computes document data usage efficiencies based on a history of a particular place of use and the stored period of time in which the document identifier was read by the accumulator device in correspondence with document identifiers for each document of the plurality of document, wherein the document data usage efficiencies are a score which is computed by the computing part, which computes the score based on a summation of a predetermined score value assigned to a number of times a document was used and a predetermined score value assigned to the period of time that the documents were used as stored in the accumulator device;

a specification part that analyzes document data usage efficiencies computed by the computing part, of at least a portion of the documents, and identifies the documents that meet a predetermined threshold data efficiency; and an output part that outputs the document identified by the specification part, wherein the document identifiers are stored in a wireless tag and the wireless tag has an optical sensor installed in the wireless tag, the optical sensor sensing brightness above a predetermined threshold brightness value, and wherein the optical sensor permits wireless communications for the wireless tag under the condition that the predetermined threshold brightness value is detected for a period that exceeds a predetermined time period.

4. The document management system of claim 3, wherein the wireless tag storing the document identifier is attached to the at least one document receptacle; and any of the plurality of reading parts perform wireless communications with the wireless tag located nearby, and read the document identifier from the wireless tag.

5. The document management system of claim 3, wherein any of the plurality of reading parts perform image acquisition on the image of the at least one document or receptacle that accommodate document, and read, from the image acquired, the document identifier using image recognition processes.

6. The document management system of claim 3, wherein the installation site of at least one of the reading parts includes the particular place of use of the document; and the computing part, for each document, based on the place information and a history of the time information stored by the accumulation part in correspondence with the document identifier of the document, determines the rate of usage of the document based on the frequency of taking the document into the particular place of use.

7. The document management system of claim 3, wherein the installation site of the at least one of the reading parts includes the particular place of use of the document, and wherein, the computing part, for each document, based on the place information and a history of the time information stored by the accumulation part in correspondence with the document identifier of the document, determines the rate of usage based on the number of particular places of use into which the document is taken over a period of time.

8. The document management system of claim 3, wherein the installation site of the at least one of the reading parts includes a place where the document was generated, a place where the document was discarded, and the particular place of use of the document; and wherein, the computing part, for each document, based on the place information and a history of the time information stored by the accumulation part in correspondence with the document identifier of the document, determines the rate of usage based on a time from when the document is generated until a time when the document is discarded.

9. The document management system of claim 3, wherein the installation site of the at least one of the reading parts includes a place where the document is generated, a place where the document is discarded, and the particular place of use of the document, and wherein, the computing part, for each document, based on the place information and a history of the time information stored by the accumulation part in correspondence with the document identifier of the document, determines the rate of usage based on the time by which a document was taken to a particular place of use and over the entire life of the document.

10. The document management system of claim 3, wherein the installation site of the at least one of the reading parts includes identifying a user of the document, who defines a user prioritization level;

the computing part, for each document, determines a document prioritization level, based on the user prioritization level of the user, using the document and an amount of time the document is used by the user.

11. A document management system that manages a plurality of documents, the system comprising:

a plurality of reading parts that read from at least one document of the plurality of documents or from a receptacle that accommodates the at least one document, a document identifier assigned to the document;

an accumulator device that stores, in correspondence, a document identifier read by any one of the plurality of reading parts, places information representing an installation site of the any one of the plurality of reading parts that read the document identifier, and time information representing a period of time in which the document identifier was read;

a computing part that computes document data usage efficiencies based on a particular place of use and the stored period of time in which the document identifier was read by the accumulator device in correspondence with document identifiers for each document of the plurality of document, wherein the document data usage efficiencies are a score which is computed by the computing part, which computes the score based on a summation of a predetermined score value assigned to a number of times a document was used and a predetermined score value assigned to the period of time that the documents were used as stored in the accumulator device;

a comparison part that compares document data usage efficiencies computed by the computing part, of at least a portion of the documents, wherein the documents that meet a predetermined data efficiency are identified;

a setting part that sets a priority of digitization for each identified document corresponding to data of each document, based on the comparison results from the comparison part; and an output part that outputs the priority of digitization set by the setting part, wherein the document identifiers are stored in a wireless tag and the wireless tag has an optical sensor installed in the wireless tag, the optical sensor sensing brightness above a predetermined threshold brightness value, and wherein the optical sensor permits wireless communications for the wireless tag under the condition that the predetermined threshold brightness value is detected for a period that exceeds a predetermined time period.

12. The document management system of claim 11, wherein the wireless tag storing the document identifier is attached to the at least one document receptacle; and any of the plurality of reading parts perform wireless communications with the wireless tag located nearby, and read the document identifier from the wireless tag.

13. The document management system of claim 11, wherein any of the plurality of reading parts perform image acquisition on the image of the at least one document or receptacle that accommodate document, and read, from the image acquired, the document identifier using image recognition processes.

14. The document management system of claim 11, wherein the installation site of at least one of the reading parts includes the particular place of use of the document; and the computing part, for each document, based on the place information and a history of the time information stored by the accumulation part in correspondence with the document identifier of the document, determines the rate of usage of the document based on the frequency of taking the document into the particular place of use.

15. The document management system of claim 11, wherein the installation site of the at least one of the reading parts includes the particular place of use of the document, and wherein, the computing part, for each document, based on the place information and a history of the time information stored by the accumulation part in correspondence with the document identifier of the document, determines the rate of usage based on the number of particular places of use into which the document is taken over a period of time.

16. The document management system of claim 11, wherein the installation site of the at least one of the reading parts includes a place where the document was generated, a place where the document was discarded, and the particular place of use of the document; and wherein, the computing part, for each document, based on the place information and a history of the time information stored by the accumulation part in correspondence with the document identifier of the document, determines the rate of usage based on a time from when the document is generated until a time when the document is discarded.

17. The document management system of claim 11, wherein the installation site of the at least one of the reading parts includes a place where the document is generated, a place where the document is discarded, and the particular place of use of the document, and wherein, the computing part, for each document, based on the place information and a history of the time information stored by the accumulation part in correspondence with the document identifier of the document, determines the rate of usage based on a number of times a document was taken to a particular place of use and over the entire life of the document.

18. The document management system of claim 11, wherein the installation site of the at least one of the reading parts includes identifying a user of the document, who defines a user prioritization level;

the computing part, for each document, determines a document prioritization level, based on the user prioritization level of the user, using the document and an amount of time the document is used by the user.

19. A document management method wherein a system having a plurality of reading parts that read from at least one document of a plurality of documents or from a receptacle that accommodates the at least one document, a document identifier assigned to the document and an accumulator device that stores information, the method comprising:

accumulating, in correspondence, a document identifier read by any one of the plurality of reading parts, places information representing an installation site of the any of one of the plurality of reading parts that read the document identifier, and time information representing a period of time in which the document identifier was read;

computing document data usage efficiencies based on a history of a particular place of use and the stored period of time in which the document identifier was read by the accumulator device in correspondence with document identifiers for each document of the plurality of document, wherein the document data usage efficiencies are a score which is computed by the computing part, which computes the score based on a summation of a predetermined score value assigned to a number of times a document was used and a predetermined score value assigned to the period of time that the documents were used as stored in the accumulator device;

analyzing document data usage efficiencies computed in the step of the computing and identifying a document that meets a predetermined threshold data efficiency; and outputting the document identified in the step of the identifying, wherein the document identifiers are stored in a wireless tag and the wireless tag has an optical sensor installed in the wireless tag, the optical sensor sensing brightness above a predetermined threshold brightness value, and wherein the optical sensor permits wireless communications for the wireless tag under the condition that the predetermined threshold brightness value is detected for a period that exceeds a predetermined time period.

20. A document management method wherein a system having a plurality of reading parts that read from at least one document of the plurality of documents or from a receptacle that accommodates the at least one document, a document identifier assigned to the document and an accumulator device that stores information, the method comprising:

accumulating, in correspondence, a document identifier read by any one of the plurality of reading parts, places information representing an installation site of the any one of the plurality of reading parts that read the document identifier, and time information representing a period of time in which the document identifier was read;

computing document data usage efficiencies based on a history of a particular place of use and the stored period of time in which the document identifier was read by the accumulator device in correspondence with document identifiers for each document of the plurality of document, wherein the document data usage efficiencies are a score which is computed by the computing part, which computes the score based on a summation of a predetermined score value assigned to a number of times a document was used and a predetermined score value assigned to the period of time that the documents were used as stored in the accumulator device;

analyzing document data usage efficiencies computed in the step of the computing, wherein documents that meet a predetermined threshold data efficiency are identified;

setting a priority of digitization for each identified document corresponding to data of each document, based on the comparison results compared in the step of the comparing; and outputting the priority of digitization set in the step of the setting, wherein the document identifiers are stored in a wireless tag and the wireless tag has an optical sensor installed in the wireless tag, the optical sensor sensing brightness above a predetermined threshold brightness value, and wherein the optical sensor permits wireless communications for the wireless tag under the condition that the predetermined threshold brightness value is detected for a period that exceeds a predetermined time period.

* * * * *